March 21, 1950  G. H. FLETCHER  2,501,502
CURRENT COLLECTOR AND CONE INSULATOR THEREFOR
Filed Aug. 30, 1946
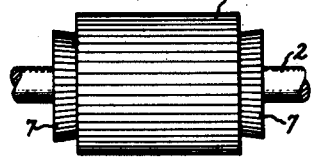
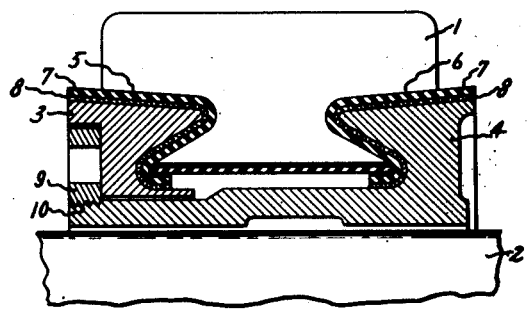
Inventor:
George H. Fletcher,
by Browell J. Mack
His Attorney.

Patented Mar. 21, 1950

2,501,502

UNITED STATES PATENT OFFICE 2,501,502

CURRENT COLLECTOR AND CONE INSULATOR THEREFOR

George H. Fletcher, Sheffield, England, assignor, by mesne assignments, to General Electric Company, a corporation of New York Application August 30, 1946, Serial No. 694,119
In Great Britain October 11, 1945

7 Claims. (Cl. 171—321)

My invention relates to current collectors and in particular to an improved commutator and a commutator cone insulator.

An object of my invention is to provide an improved current collector.

Another object of my invention is to provide an improved current collector insulating cone member.

Further objects and advantages of my invention will become apparent and my invention will be better understood from the following description referring to the accompanying drawing and the features of novelty which characterize my invention will be pointed out with particularity in the claims annexed to and forming part of this specification.

In the drawing, Fig. 1 is a side elevational view of a commutator fully assembled and provided with an embodiment of my invention; and Fig. 2 is a partial side elevational view, in section, of a commutator provided with an embodiment of my improved current collector structure.

Current collectors, such as commutators, formed of a plurality of bars held together by retaining rings and insulated from these rings by mica sheets pasted together and suitably sanded or otherwise finished to the desired thickness have been used in the past. Most of these commutator insulators are formed as cones built up of superposed layers of mica bonded together with shellac or a similar resin varnish. However, difficulty has frequently been encountered in obtaining uniform density of the bonded mica throughout the commutator cone, and it has also been found that the density may vary along the periphery in the relative proportions of the mica and shellac or other bonding agents, and these variations may become even more pronounced as the commutator ages. It also has been proposed to overcome some of this difficulty by providing a cushion between the mica material and the commutator segments by the introduction of layers of asbestos or other similar compressible insulating material, but this has not proved entirely satisfactory.

In order to overcome these difficulties, I propose making a current collector in which the insulating cone is made of a composite material having the desirable high dielectric properties of the bonded mica material arranged adjacent the current carrying commutator bars and having another material which has a characteristic enabling it to flow to a certain limited extent before it is finished to its final dimensions to assure a uniform thickness of the insulating cone member. According to the present invention a dynamoelectric machine commutator is made with insulating V-rings each comprising at least two superposed layers of insulating material. The outer layer (that is, the one which in the finished commutator lies nearest the commutator segments) is preformed of mica laminations bonded together as with shellac, and the inner layer is formed of a substance which during the construction of the V-ring is compressible and which thereafter is rendered incompressible and mechanically stable at the normal working temperature of the finished commutator. This latter material may properly be made up of a fibrous sheet or woven fabric, such as glass cloth, which is impregnated with a thermosetting resin, such that the woven fabric of glass fibers which are embedded in or coated with the synthetic resin of the thermosetting type will flow to a certain extent prior to the curing of the resin. This result may be attained by subjecting the cone to a predetermined pressure with the mica material forming one layer of the cone superposed on a layer of the thermosetting resin-impregnated fabric material and then heating the cone under pressure to cure or set the resin. By this arrangement of the two materials in the insulating cone, the desired uniform thickness is obtained, and by arranging the high dielectric mica material with its high heat-resisting characteristic adjacent the commutator segments, the other material is not subjected to these relatively high stresses. In some instances, it may be found desirable to utilize a plurality of successive layers of the bonded mica material and layers of the thermosetting resin-impregnated woven fabric fibrous material. Also, the thermosetting resin which is used may be any of a variety of such resins which are well known, examples of which are the phenol-formaldehyde, cresol-formaldehyde, or urea-formaldehyde types. Furthermore, if desired, the space between the woven fabric fibers may be filled with materials, such as kaolin or china clay.

This type improved current collector may be in the form of a commutator, as shown in Fig. 1, provided with a plurality of electrically conductive current carrying bar members 1 which are adapted to be secured together and mounted on a suitable rotatable member shaft 2. These bars are suitably insulated from each other and are adapted to be held in assembled relationship by a pair of V-ring retaining and mounting members 3 and 4 which are formed with annular flanges adapted to extend into retaining V- notches 5 and 6 formed in each end of the commutator bars 1. The retaining rings 3 and 4 are insulated from the commutator bars 1 by suitable cone-insulating members arranged at each end of the current collector between the commutator bars 1 and the V-rings 3 and 4. These insulating cone members are formed of a bonded mica sheet material 7 which is arranged adjacent the surface of the electric current carrying commutator bar members 1 and is bonded to a layer of thermosetting resin-impregnated woven fabric or fibrous sheet material, such as glass cloth 8, which is arranged adjacent the surface of the current collector mounting and securing V-rings 3 and 4. These insulating cones are preformed and preferably the bonded mica sheet material layer is bonded to the resin-impregnated fibrous sheet material layer by a suitable material, such as the resin which is used to impregnate the fibrous sheet material, and these cones are formed to the desired V-ring contours under pressure and heat to provide a cure or set for the thermosetting resin. In this manner, the insulating cone members are formed with properties characteristic of the materials used in which the thermosetting resin-impregnated material has been set by heat treatment under pressure with the bonded mica material to provide an insulating cone of uniform thickness. In order to maintain the commutator in assembled relationship, any desired securing means may be provided for clamping together the V-rings at opposite ends of the current collector. In the illustrated arrangement, this comprises a biasing nut 9 which threadedly engages a threaded portion 10 on one end of the hub of the V-ring 4 and engages the outer radial surface of the V-ring 3 for biasing these two V-ring retaining members toward each other to clamp together the commutator bars 1 under the desired pressure.

While I have illustrated and described a particular embodiment of my invention, modifications thereof will occur to those skilled in the art. I desire it to be understood, therefore, that my invention is not to be limited to the particular illustrated arrangement, and I intend in the appended claims to cover all modifications which do not depart from the spirit and scope of my invention.

What I claim as new and desire to secure by Letters Patent of the United States is:

1. A current collector insulating cone member formed of a layer of bonded mica material and having bonded thereto a thermosetting resin-impregnated woven fabric material having properties characteristic of such material in which the thermosetting resin-impregnated material has been set by heat treatment under pressure with said bonded mica material to provide an insulating cone of uniform thickness.

2. A current collector insulating cone member formed of a preformed layer of bonded mica material and a layer of thermosetting resin impregnated glass cloth material having properties characteristic of such material in which the thermosetting resin-impregnated glass cloth material has been set by heat treatment under pressure with said bonded mica material to provide an insulating cone of uniform thickness.

3. A current collector insulating cone member formed of a preformed layer of bonded mica material and a layer of thermosetting phenol-formaldehyde resin-impregnated glass cloth material having properties characteristic of such material in which the thermosetting resin-impregnated material has been set by heat treatment under pressure with said bonded mica material to provide an insulating cone of uniform thickness.

4. A current collector insulating cone member formed of a preformed bonded mica sheet material adapted to be arranged adjacent the surface of the electric current carrying member of the current collector and having bonded thereto a thermosetting resin-impregnated fibrous sheet material adapted to be arranged adjacent the surface of the current collector mounting and securing members and having properties characteristic of such material in which the thermosetting resin-impregnated material has been set by heat treatment under pressure with said bonded mica material to provide an insulating cone of uniform thickness.

5. A current collector including a plurality of bars of electrically conductive material each having a retaining notch in each end thereof, a ring retaining member at each end of said current collector having a flange extending into said bar retaining notches, a separate cone insulating member at each end of said current collector arranged between said bars and said rings in said notches, said cone insulating members comprising a preformed bonded mica sheet material arranged adjacent the surface of the notches in the electrically conductive bars and having bonded thereto a thermosetting resin-impregnated glass cloth material arranged adjacent the surface of the flanges of said rings and having properties characteristic of cones in which the thermosetting resin-impregnated material has been set by heat treatment under pressure with said bonded mica material to provide an insulating cone of uniform thickness, and means for biasing said ring retaining members at each end of said current collector into clamping engagement with said insulating cones in said notches of said electrically conductive bars for holding said current collector in assembled relationship.

6. A current collector including a plurality of bars of electrically conductive material each having a retaining V-notch in each end thereof, a V-ring retaining member at each end of said current collector having a flange extending into said bar retaining V-notches, a separate insulating member at each end of said current collector arranged between said bars and said V-rings in said V-notches, said insulating members comprising a preformed bonded mica sheet material arranged adjacent the surface of the V-notches in the electrically conductive bars and having bonded thereto a thermosetting resin-impregnated woven fabric material arranged adjacent the surface of the flanges of said V-rings and having properties characteristic of material in which the thermosetting resin-impregnated material was during the construction of the V-ring compressible and which thereafter has been set by heat treatment under pressure with said bonded mica material to render it incompressible and to provide an insulating member of uniform thickness, and means for biasing said V-ring retaining members at each end of said current collector into clamping engagement with said insulating members in said V-notches of said electrically conductive bars for holding said current collector in assembled relationship.

7. An insulating V-ring for the commutator of a dynamoelectric machine comprising at least two layers with the outer layer thereof preformed of bonded mica laminations, and the inner layer thereof formed of a substance which during the construction of the V-ring is compressible and which thereafter has been rendered incompressible and mechanically stable at the normal working temperature of the finished commutator, said substance comprising a woven fabric impregnated with a thermosetting synthetic resin rendered incompressible by heat treatment in situ.

GEORGE H. FLETCHER.

REFERENCES CITED

The following references are of record in the file of this patent:

UNITED STATES PATENTS

| Number | Name | Date |
|---|---|---|
| 1,157,912 | Turner | Oct. 26, 1915 |
| 2,202,820 | Baird et al. | June 4, 1940 |
| 2,363,324 | Hill | Nov. 21, 1944 |